(No Model.) 2 Sheets—Sheet 1.
J. B. DUNLOP, Sr. & J. B. DUNLOP, Jr.
SPRING RIM FOR WHEELS.
No. 501,409. Patented July 11, 1893.
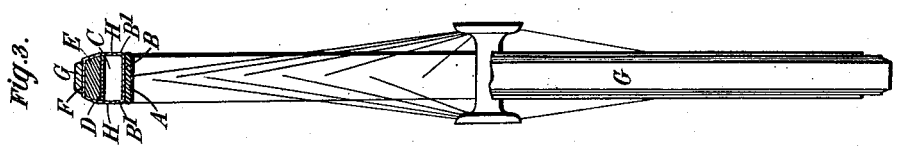
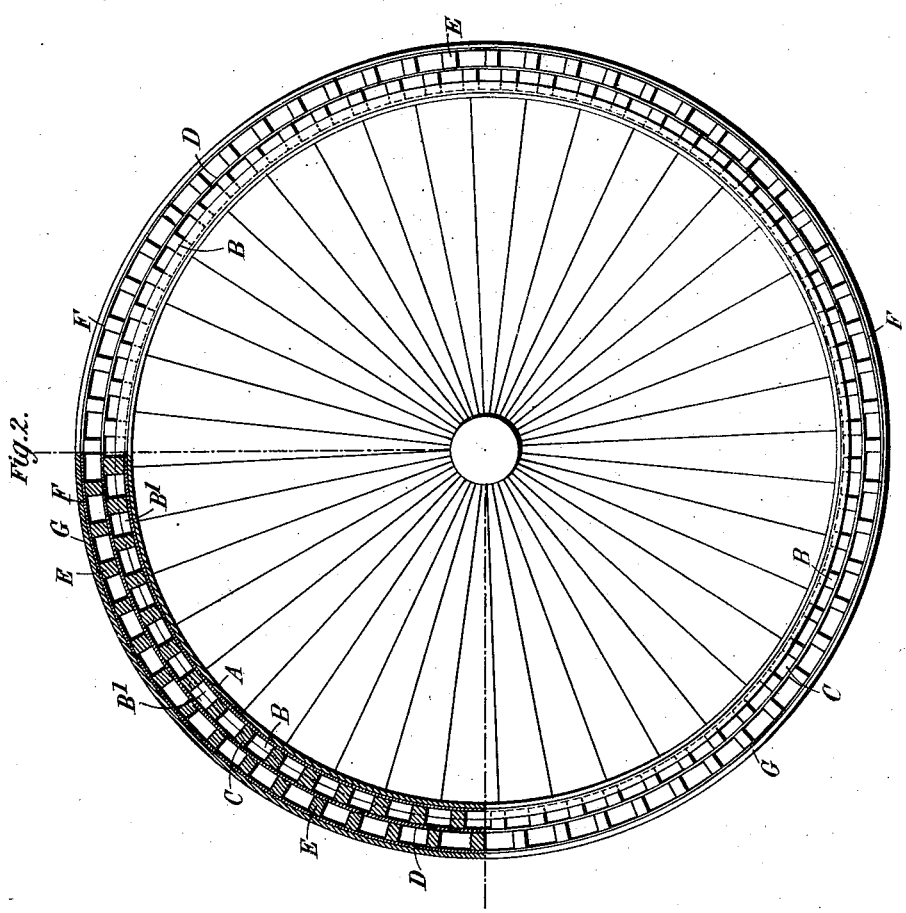
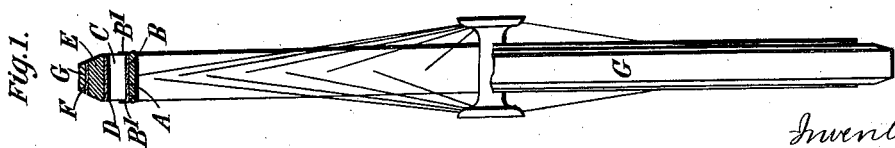

(No Model.) 2 Sheets—Sheet 2.
J. B. DUNLOP, Sr. & J. B. DUNLOP, Jr.
SPRING RIM FOR WHEELS.
No. 501,409. Patented July 11, 1893.
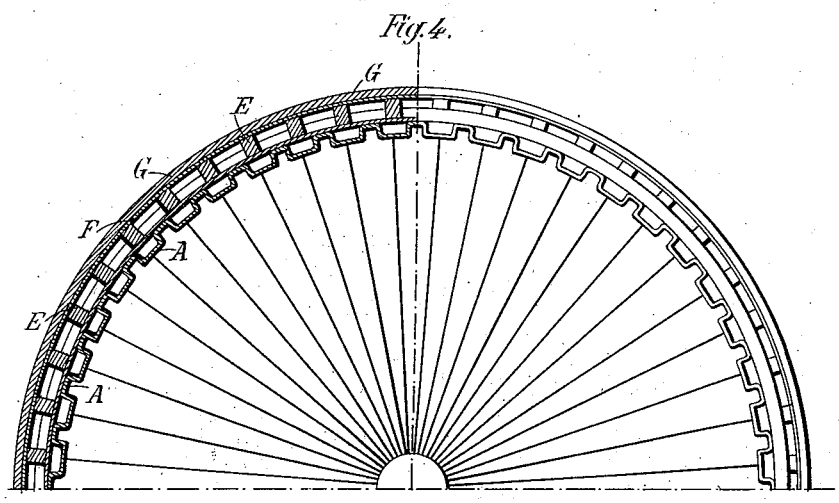
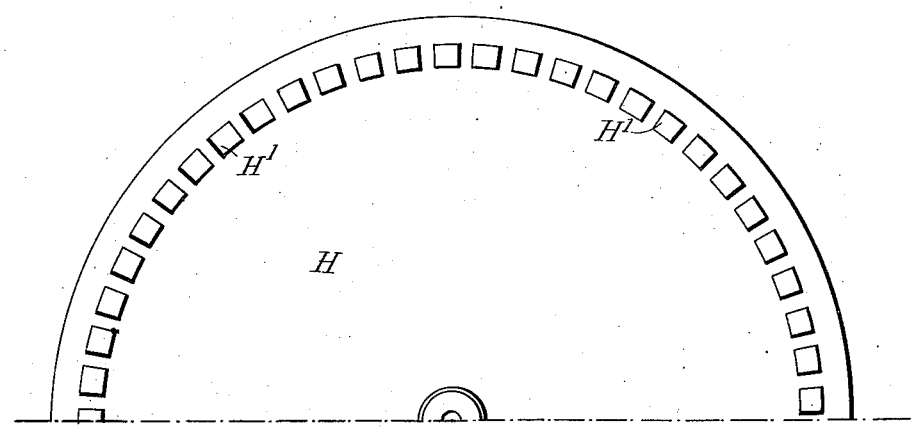
Witnesses,
Inventors,
John Boyd Dunlop, Sr.
John Boyd Dunlop, Jr.

UNITED STATES PATENT OFFICE.

JOHN BOYD DUNLOP, SR., AND JOHN BOYD DUNLOP, JR., OF DUBLIN, IRELAND; SAID DUNLOP, JR., ASSIGNOR TO SAID DUNLOP, SR.

SPRING-RIM FOR WHEELS.

SPECIFICATION forming part of Letters Patent No. 501,409, dated July 11, 1893.

Application filed February 9, 1893. Serial No. 461,611. (No model.)

*To all whom it may concern:*

Be it known that we, JOHN BOYD DUNLOP, Sr., veterinary surgeon, and JOHN BOYD DUNLOP, Jr., student, both subjects of the Queen of Great Britain, and both residents of Blackrock, Dublin, Ireland, have invented certain new and useful Improvements in Spring Rims or Tires for Wheels and Apparatus for Use in the Construction of the Same, of which the following is a specification, reference being had to the accompanying drawings.

Our invention relates to spring rims or tires for wheels and apparatus for use in the construction of the same and has for its object to provide elastic and highly resilient tires or rims.

According to our invention we secure to the outer periphery of the rigid rim of the wheel a series of blocks or pieces of india-rubber or the like at suitable intervals and outside the said blocks or pieces we place one or more bands or strips of canvas, cloth or other pliable and comparatively inelastic material. On the outer periphery of the canvas or other strips or bands we secure another circular row or series of blocks as above described arranged so as to break joint with the inner row, that is to say, the blocks in the outer row are placed opposite the spaces between the blocks of the inner row. A canvas or other strip or band is secured round the outer row of blocks and a tire of any description may then be placed on the outside again to form the tread of the wheel.

In order that the nature of our invention may be more clearly understood we will now proceed to describe the same with reference to the accompanying drawings, in which—

Figure 1 is a side view partly sectional of a wheel fitted with a spring rim or tire constructed according to our invention. Figs. 2 and 3 are front views partly sectional of the same. Fig. 4 is a part view similar to Fig. 1, showing a modified form of wheel, and Fig. 5 is a part plan of a device which we use in the construction of our improved wheels.

Referring now to Figs. 1 and 2 A is the rigid rim of the wheel which may be solid or hollow and which has a cylindrical outer periphery either with or without flanges at the sides. The said rim is covered with cloth or the like B which is cemented or otherwise secured thereto. If desired wires or bands may be passed round the wheel near the edges of the rim in order to more effectually secure the cloth or the like to the same; such binding wires may lie in small grooves or seats formed on the rigid rim. The strip of cloth or the like is preferably broader than the rim and its edges B' are turned radially outward so as to be secured to the inner row of blocks of pieces of india-rubber as is hereinafter more particularly indicated.

C, C are blocks or pieces of india-rubber or other suitable material secured at suitable intervals on the outer periphery of the rigid rim so as to form a circular course or row with spaces between them.

To enable the operator or workman to accurately space the blocks round the rim of the wheel we employ the device shown in Fig. 5, where H is a disk of metal or other suitable material of larger diameter than the said rim to which the blocks are to be secured, and furnished with projections H' corresponding in size and position to the spaces which are to be left between the blocks when the latter are in their final position on the rigid rim of the wheel. When using the said device we lay the wheel on the plane surface thereof concentric with the circle of projections on the same and secure the blocks to the rigid rim between the said projections. The turned out edges B' of the cloth B are secured to the sides of the india-rubber blocks or pieces. Outside the circular row or course of blocks C we secure a second band or strip of cloth or the like D and on the outer periphery of the second strip we place a second row or course of blocks E. The spaces between the blocks of the outer row are arranged to come opposite the blocks of the inner row so as to break joint. Outside the outer row of blocks we pass another strip or band of canvas F which is covered again with a strip of india-rubber G to protect the same from wear and form this tread portion of the wheel. The said tread portion may be of any suitable section and we sometimes provide it with a central circumferential ridge or with ridges to more effectually prevent side-slip.

The strips of cloth or the like we use are in all cases protected with a thin layer of india-rubber either vulcanized or unvulcanized. The blocks or the like and the strip or bands of cloth or the like and the tread portion of the rim are secured to each other by india-rubber solution or other suitable cement.

In a modified method of making our improved spring rim or tire we build up and vulcanize all of the parts of the tire in a suitable mold or molds. The sides of the blocks and the spaces between the same may be covered by sheet rubber or other material H secured by cement thereby inclosing the said spaces and forming cavities as shown in Fig. 3, or the tire may be molded after this form but preferably the spaces are left open as hereinbefore described.

We preferably use bands of canvas in which the longitudinal or warp threads are stronger than the cross or weft threads and we pass the said bands one or more times round the circumference of the wheel outside the blocks. Each block may consist of a core of cork or other material or hard rubber surrounded by a shell of soft rubber which is secured to the band or strip of cloth, but we prefer in most cases to make the blocks homogeneous and solid. We prefer that the blocks be placed in position straight across the rim, that is to say the long axis of the blocks should lie parallel to the axle.

Our improved spring rim or tire need not be made with two rows of blocks only, as we obviously can place one or more rows of the same outside the second row before securing thereon the tread portion of the wheel. Also when we desire to produce a very light tire we reduce the size of the innermost row of blocks or dispense with the same in which case we use a rim of zig-zag or castellated or corrugated form following the outline of the inner row of blocks, as shown in Fig. 4. We prefer however, in most cases to construct the tire or spring rim as described.

We sometimes combine our spring tire or rim with the flexible rim of a spring wheel for the purpose of increasing its resiliency and strengthening the same.

Our improved spring tires may be molded or built on temporary rims or hoops and afterward removed and sprung on the covered rims of the wheels on which they are intendto be used.

What we claim is—

1. The combination with a wheel having a rigid rim, of a spring tire made up of rows of elastic blocks secured at intervals on the rim and bands of canvas wrapped round each said row of blocks, substantially as and for the purpose specified.

2. The combination with a wheel having a flexible rim of a spring tire made up of rows of elastic blocks secured at intervals on the rim and bands of canvas wrapped round each said row of blocks, substantially as described for the purpose specified.

3. The combination with a wheel of bands of canvas broader than and secured to the rim thereof, a row of blocks of india rubber secured at intervals to said band, the sides of said blocks being cemented to the overlapping edges of said band and other bands and blocks placed outside said row of blocks, substantially as for the purposes specified.

4. The combination with a wheel of bands of canvas secured at intervals on the rim thereof, blocks of india rubber secured to the said canvas bands, other bands and blocks secured outside the inner row, and an outer band of canvas and india rubber furnished with a projecting central ridge or ridges, substantially as described for the purpose specified.

5. The combination with a wheel of bands of canvas secured on the rim, blocks of rubber secured at intervals to the said bands, outer canvas bands covered with india rubber to form the tread surface of the wheel, and side strips of rubber or other suitable material to cover the spaces between the blocks, substantially as described for the purpose specified.

6. The combination with a wheel having a rigid corrugated or castellated rim, of bands of canvas secured thereon, and a row of blocks of india rubber secured at intervals on said bands, and other bands of canvas placed outside said row of blocks substantially as described and for the purpose specified.

7. In the manufacture of a spring rim or tire having blocks of rubber or the like spaced at intervals on the rim of a wheel, the employment of a flat disk of larger diameter than the rim of the wheel and having projections on the sides thereof of the shape size and position of the desired spaces between the blocks to be placed on the rim of the wheel, substantially as described for the purpose specified.

In witness whereof we have hereunto set our hands this 25th day of January, 1893.

JOHN BOYD DUNLOP, SENIOR.
JOHN BOYD DUNLOP, JUNIOR.

Witnesses:
J. A. WILSON,
ROBT. H. BEAUCHAMP, N. P.